US006392798B1

(12) United States Patent
Newkirk

(10) Patent No.: US 6,392,798 B1
(45) Date of Patent: May 21, 2002

(54) APPARATUS FOR HOLDING VIEWING DEVICES AT EYE LEVEL

(75) Inventor: Darrel D. Newkirk, Kansas City, KS (US)

(73) Assignee: Hevec, L.L.C., Kansas City, KS (US)

( * ) Notice: Subject to any disclaimer, the term of this patent is extended or adjusted under 35 U.S.C. 154(b) by 0 days.

(21) Appl. No.: 09/532,201

(22) Filed: Mar. 22, 2000

(51) Int. Cl.[7] .................. G02B 23/00; G02B 27/22; G09G 5/00
(52) U.S. Cl. .................. 359/409; 359/406; 359/477; 359/811; 345/8
(58) Field of Search .................. 359/362–363, 359/375–378, 381–385, 399, 404–409, 429–430, 477–482, 800, 803, 804, 808–812, 815–816; 351/41, 158; 2/10–13, 410, 422, 426; 345/7, 8, 9; 248/42, 48, 53

(56) References Cited

U.S. PATENT DOCUMENTS

| 4,198,114 A | * | 4/1980 | Zapp ................. 359/376 |
| 5,020,897 A | * | 6/1991 | Frye ................. 351/158 |
| 5,276,471 A | * | 1/1994 | Yamauchi et al. ........ 351/153 |
| 5,486,841 A | * | 1/1996 | Hara et al. |
| 5,608,808 A | * | 3/1997 | Da Silva ............. 381/183 |
| 5,634,201 A | * | 5/1997 | Mooring ............. 455/90 |
| 5,914,816 A | * | 6/1999 | Soto et al. ............ 359/630 |
| 5,943,165 A | * | 8/1999 | Huang |
| 6,084,555 A | * | 7/2000 | Mizoguchi et al. |
| 6,091,832 A | * | 7/2000 | Shurman et al. ......... 381/381 |
| 6,115,846 A | * | 9/2000 | Truesdale ............. 2/209.13 |

OTHER PUBLICATIONS

Brookstone Gift Collection, Catalog No. C299–F1, Holiday 1999 issue, front cover, back cover, and p. 61.

* cited by examiner

Primary Examiner—Thong Nguyen
(74) Attorney, Agent, or Firm—Hovey Williams LLP

(57) ABSTRACT

An apparatus (10) for conveniently holding a viewing device (20) at the eye level of the user is provided, which allows the user to properly position the device (20) for ease of use without the need for continually holding the device (20), and also allows the device (20) to be pivoted to a retracted, non-use position. The apparatus (10) includes an attachment headband (16) which pivotally supports a pair of elongated, forwardly extending arms (12, 14); a tray (18) extends between and is secured to the arms (12, 14) and supports the device (20). The tray (18) is adjustable both vertically and in a fore and aft direction so that it can be precisely positioned for each individual user. A cap assembly (92) may be releasably secured to the apparatus (10) to cover the user's head and the device (20).

18 Claims, 6 Drawing Sheets

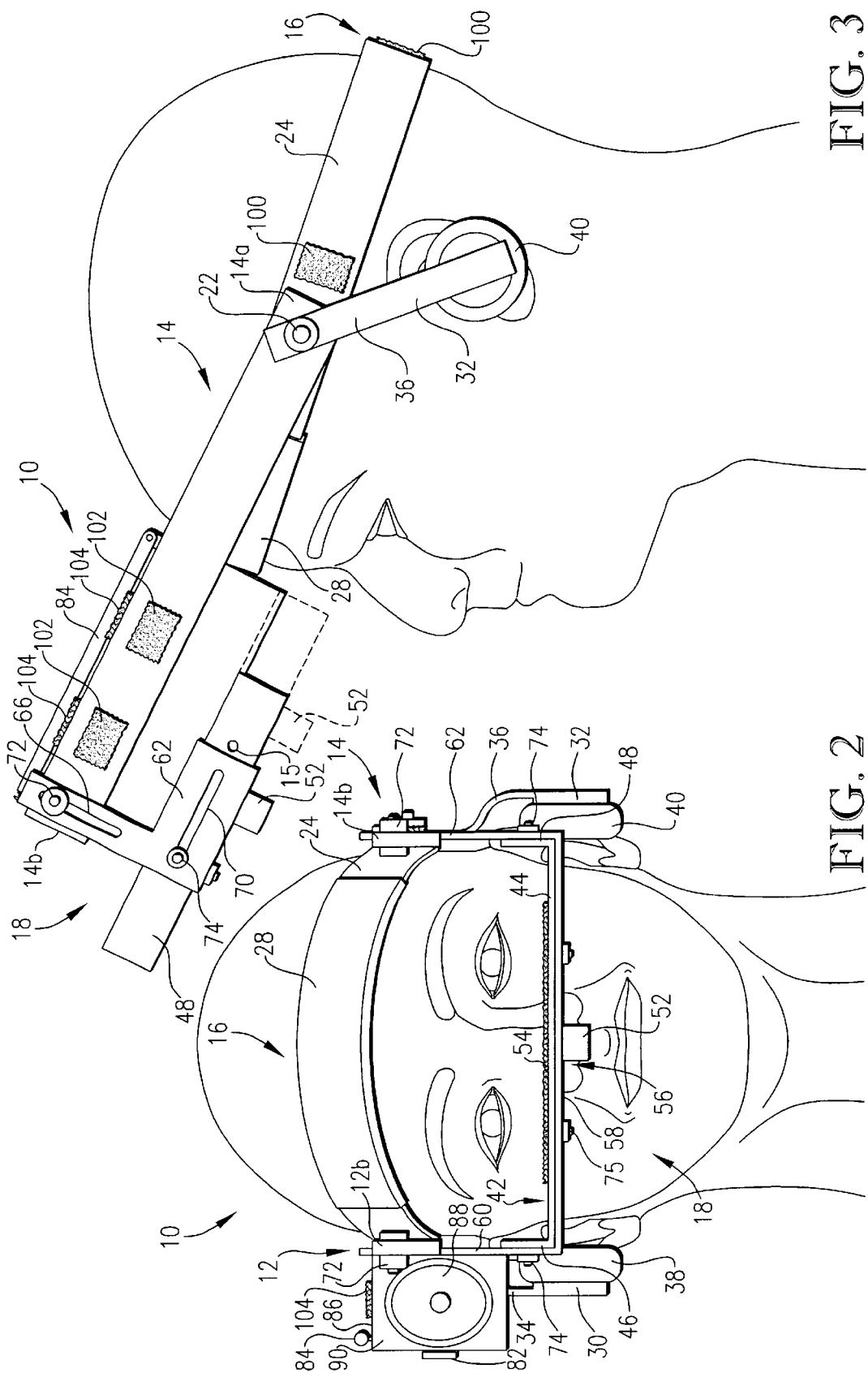

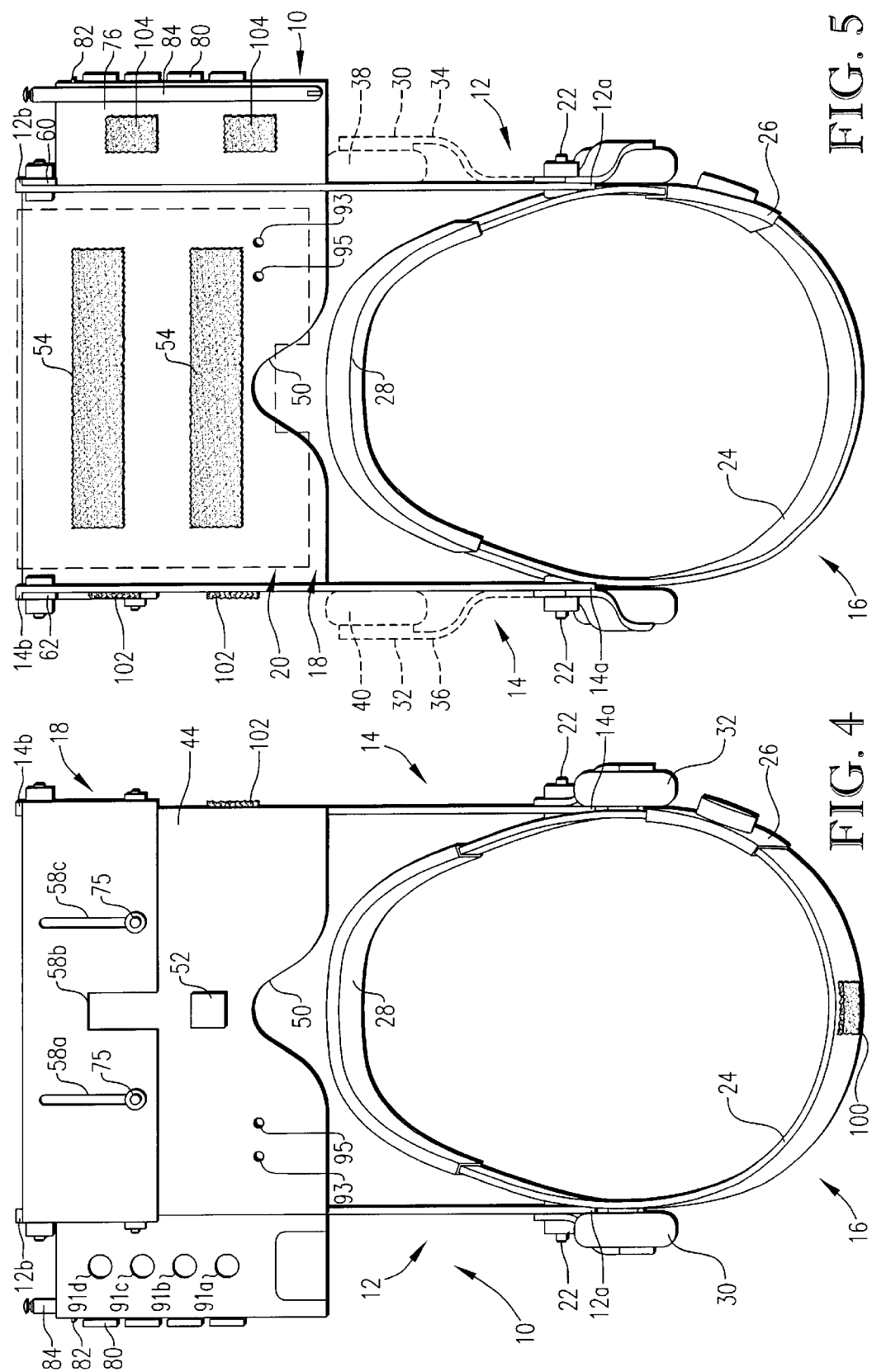

APPARATUS FOR HOLDING VIEWING DEVICES AT EYE LEVEL

BACKGROUND OF THE INVENTION

1. Field of the Invention

The present invention is broadly concerned with a head-mounted apparatus for holding a viewing device at the eye level of the user so as to eliminate the need for constantly holding the device. More particularly, the invention pertains to such an apparatus having a device-supporting tray swingably supported on a pair of elongated arms; the inboard ends of the arms are pivotally connected to an adjustable headband. At the user's discretion, the tray and supported device can be lowered and adjusted as required, or raised to a retracted, non-use position.

2. Description of the Prior Art

Persons attending sporting events or concerts often make use of binoculars or cameras to assist in their viewing and/or recording of the event or concert. Binoculars are most often simply hung about the user's neck and shoulders using a conventional strap. This means that each time binocular-assisted viewing is desired, the binoculars must be manually grasped, moved to eye level, and held in place. Similarly, cameras must be repeatedly moved to eye level, focused and operated.

In many cases, the effort required to use binoculars or cameras quickly leads to frustration and non-use. Rather than go through all of the steps required for binocular or camera use, event attendees often decide that it is more enjoyable to forego their use altogether. This is particularly the case if it is desired to simultaneously listen to an account of the event through a radio receiver, i.e., a person cannot conveniently handle and manipulate both a radio and a viewing device without considerable effort.

There is accordingly a need for apparatus which will support a viewing device on the head of the user at a comfortable eye level without the need for manually holding the device. However, to be truly functional, such apparatus must be comfortable to wear and permit easy adjustment and manipulation of the device.

SUMMARY OF THE INVENTION

The present invention overcomes the problems outlined above and provides a head-mounted apparatus for holding a viewing device at eye level while eliminating the need for holding the device in a user's hands. Broadly speaking, the apparatus of the invention includes a pair of elongated arms swingably secured to a headband-type attachment with the arms on opposite sides of the user's head and extending forwardly; a tray extends between and is supported by the arms, with the tray adapted to hold a viewing device such as binoculars or a camera. The arms are swingable between a use position where the device is at eye level, and an elevated retracted position where the device is moved out of the user's field of vision.

In more detail, the attachment is in the form of an adjustable padded headband with the arms swingably secured thereto. An adjustment bracket is coupled to the outer ends of the arms, and the tray is adjustably connected to the bracket. A component box is secured to one of the arms, and houses a power supply as well as circuitry for controlling operation of the device. The box includes external controls such as an on-off switch and adjustment knobs.

In preferred forms, the apparatus also includes headphones secured to the headband, as well as audio equipment in the form of a radio receiver, a two-way radio and/or a cellular telephone. A microphone is preferably secured to the underside of the tray to pick up the user's speech. Such audio equipment is also coupled via conventional wiring to the control circuitry within the component box. Thus, the user may listen to a radio broadcast while using the apparatus and may also participate in two-way conversations over the two-way radio or cellular telephone.

A cap assembly may also be secured to the apparatus to provide a more pleasing appearance and to give a measure of weather protection for the user and the viewing device and audio equipment forming a part of the apparatus. The cap assembly is conveniently held in place by mating Velcro attachments, and is designed to accommodate movement of the apparatus between the lower use and upper retracted non-use positions thereof.

BRIEF DESCRIPTION OF THE DRAWING FIGURES

A preferred embodiment of the present invention is described in detail below with reference to the attached drawing figures, wherein:

FIG. 2 is a front view of the apparatus of FIG. 1;

FIG. 3 is a side view of the apparatus opposite that shown in FIG. 1, and depicting the apparatus in its elevated, retracted position;

FIG. 4 is a bottom view of the apparatus;

FIG. 5 is a plan view of the apparatus, with the moveability of the earphone components illustrated in phantom;

DETAILED DESCRIPTION OF THE PREFERRED EMBODIMENTS

Figure 1:
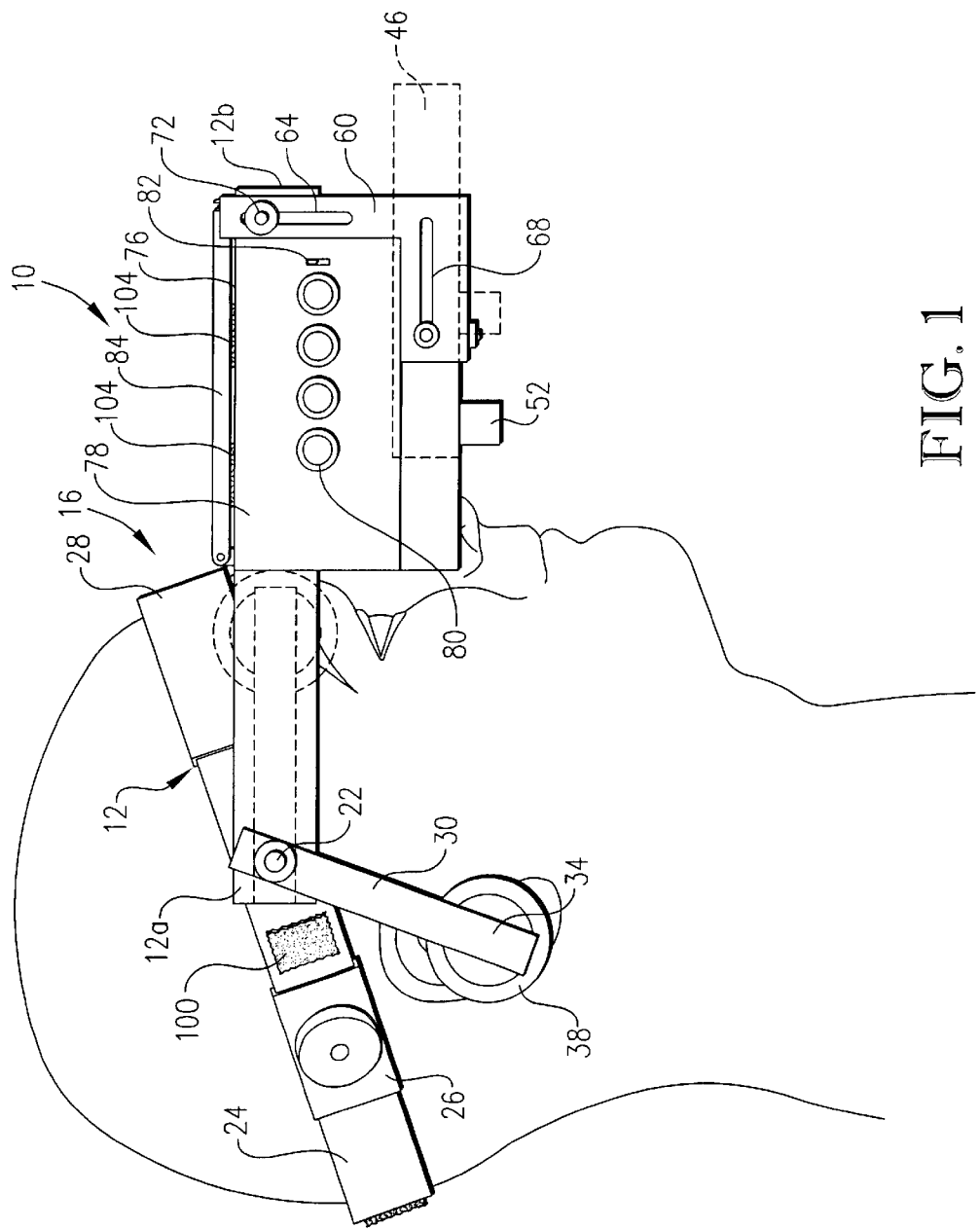
FIG. 1 is a side elevational view of the apparatus, shown mounted on the head of a user and with the selective moveability of certain of the components of the apparatus depicted in phantom.
Figure 7:
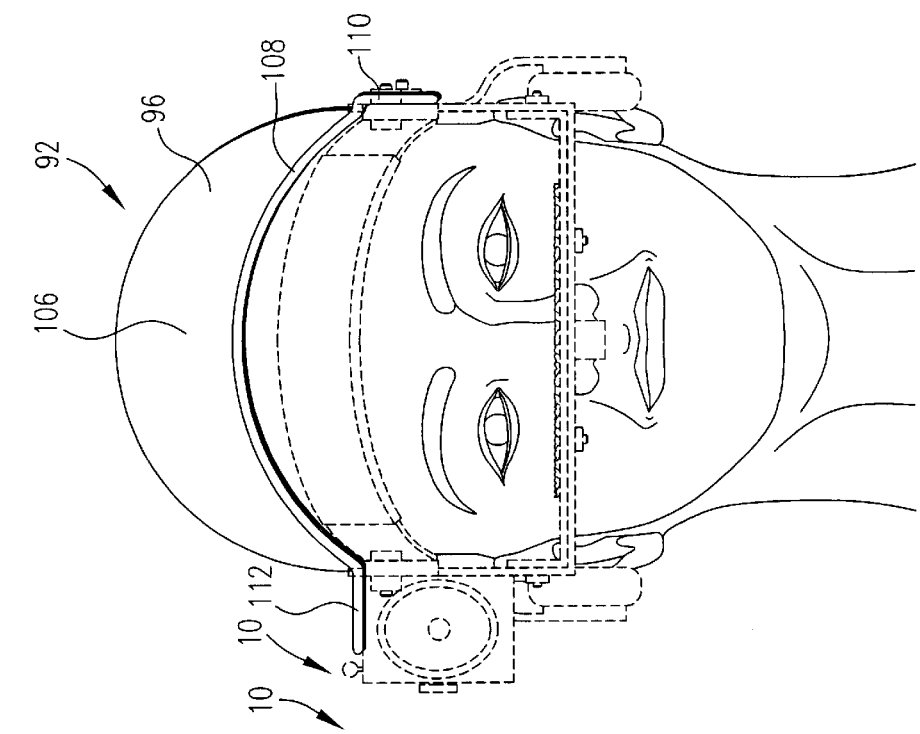
FIG. 7 is a front view of the apparatus and cap assembly depicted in FIG. 6.
Figure 6:
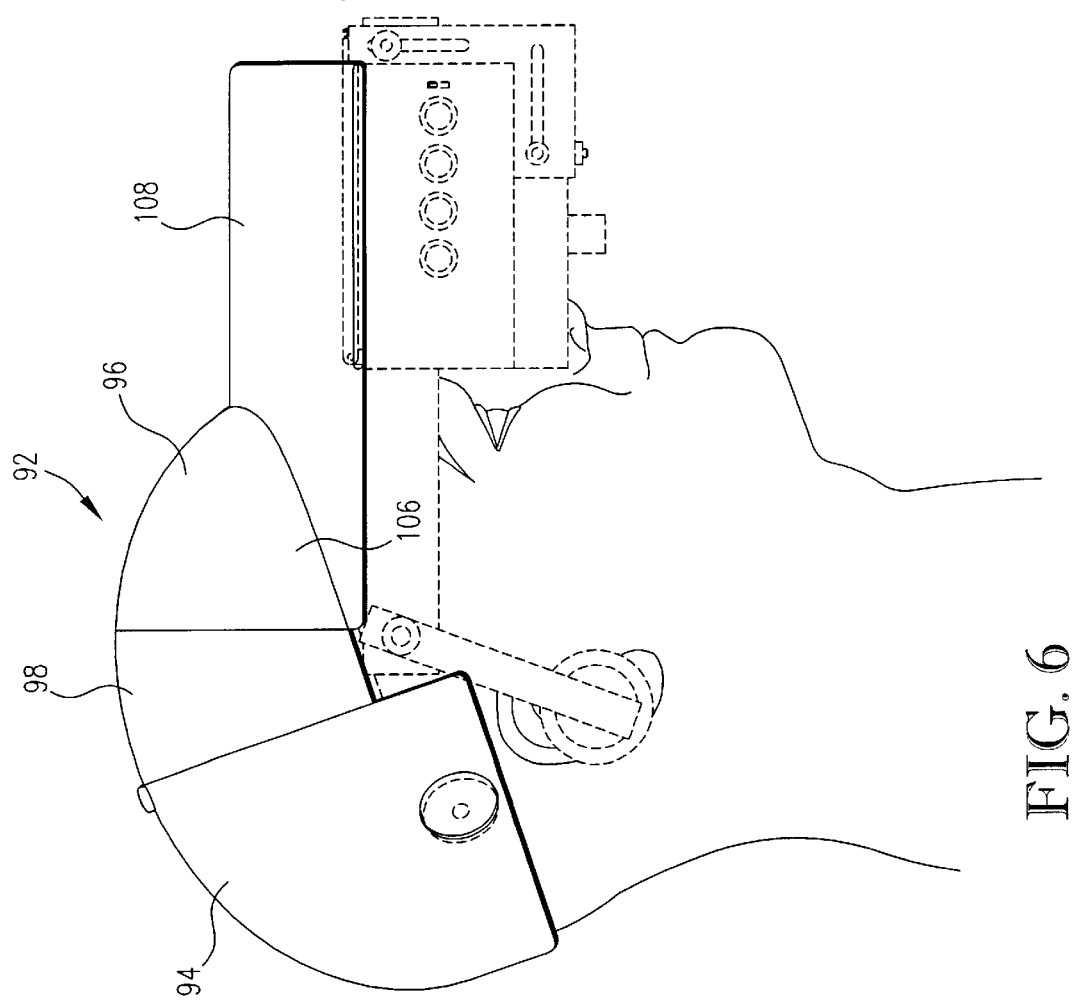
FIG. 6 is a view similar to that of FIG. 1, but showing the use of the preferred cap assembly in conjunction with the apparatus.
Figure 9:
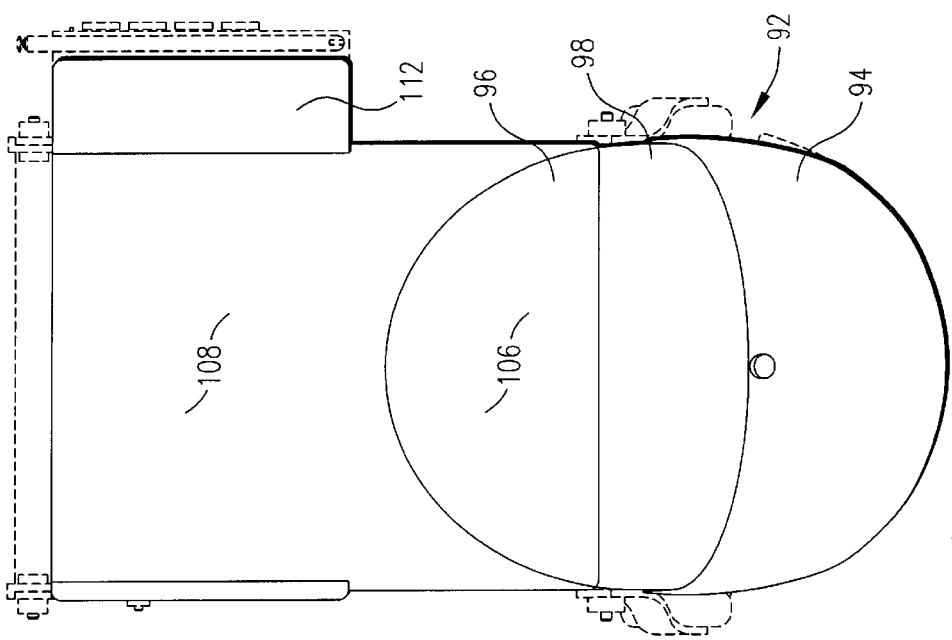
FIG. 9 is a plan view of the apparatus and cap assembly shown in FIGS. 6–8.

Turning now to the drawing Figures, and particularly FIG. 1, an apparatus 10 in accordance with the invention is illustrated. Broadly speaking, the apparatus 10 includes a pair of elongated arms 12, 14, an attachment in the form of a headband 16 supporting the arms 12, 14, and a tray 18 extending between and supported by the arms 12, 14. As depicted, the apparatus 10 is designed to be worn on the head of a user with the arms 12, 14 on opposite sides thereof. The purpose of apparatus 10 is to conveniently support a device 20 (FIG. 5) such as binoculars, video cameras, photographic cameras and/or other devices custom-designed for the tray 18. In addition, the overall apparatus 10 preferably includes audio and communication devices such as a radio receiver, a two-way radio or a cellular telephone.

In more detail, the arms 12, 14 are each formed of a suitable rigid material such as synthetic resin or metal, and present an apertured first or inboard end 12a, 14a, as well as corresponding second or outboard ends 12b, 14b. The ends 12a, 14a are swingably secured to the headband 16 by threaded fasteners 22 permitting selective swinging movement of the arms between a generally horizontal use position depicted in FIGS. 1–2 and an elevated, retracted position shown in FIG. 3.

The headband 16 is of essentially conventional design and includes an interfitted band 24 which is adjustable by means of a screw assembly 26, allowing tightening or loosening of the band 24 to accommodate different head sizes. The headband includes a forward padded overwrap section 28, and the inside of the remainder of the band 24 may be lined with soft synthetic resin foam or other material to assure a comfortable fit. First and second headphones 30, 32 are also secured to the headband 16 by the fasteners 22. To this end, each of the headphones 30, 32 includes an elongated, depending support arm 34, 36 which supports an earpiece 38, 40. Each of the headphones 30, 32 is selectively pivotal about the associated fastener 22 between a use position over the ears of the user as shown in full line in FIG. 1, and a retracted position shown in phantom.

The tray 18 is in the form of an elongated, substantially U-shaped body 42 presenting a crosspiece 44 as well as upstanding marginal sidewalls 46, 48. The rearmost marginal surface of the crosspiece 44 is shaped to present a nose-receiving recess 50 therein (see FIGS. 4–5). The underside of the crosspiece 44 carries a depending, centrally located microphone 52, whereas the upper surface thereof is provided with a pair of elongated Velcro strips 54. As shown, the sidewall 48 has a fastener opening 15 therethrough.

The tray 18 extends between and is supported by the arms 12, 14. In particular, an elongated bracket 56 is provided for interconnecting the arms 12, 14 and the tray 18. The bracket 56 has a cross member 58 as well as upstanding, somewhat L-shaped side walls 60, 62. The cross member 58 has elongated connection slots 58a, 58c and rectangular recess 58b therein, while the sidewalls 60, 62 have vertical slots 64, 66 along with horizontal slots 68, 70. The upper ends of the sidewalls 60, 62 are secured to the corresponding arms 12, 14 by means of threaded fasteners 72, in order to permit vertical adjustment of the bracket 56 and thus tray 18. Similarly, threaded fasteners 74 passing through the slots 68, 70, and threaded fasteners 75 passing through slots 58a, 58c adjustably mount the tray 18 to the bracket 56.

Figure 10:
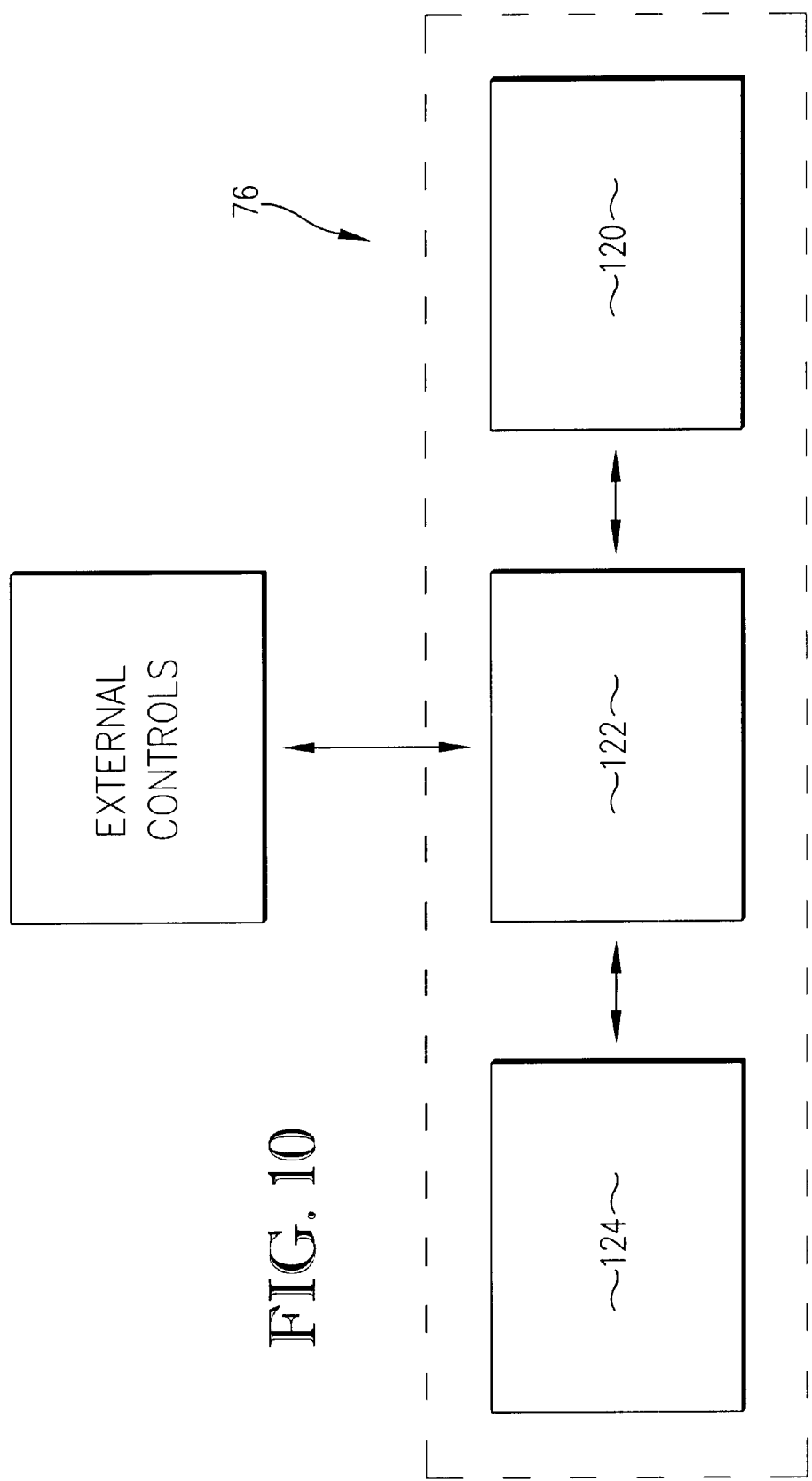
FIG. 10 is a block diagram of the contents of the component box, showing the interaction of the power supply, the control circuitry, the other equipment, and the external controls.

The arm 12 also supports an elongated, generally rectangular component box 76, the later being secured thereto by screws or other conventional connectors. The box 76 presents an outer wall 78 having a plurality of adjustment knobs 80 and an on-off switch 82 thereon. A telescoping antenna 84 is pivotally secured to the top 86 of the box. A battery operated light 88 is provided adjacent the forward wall 90 of the box (FIG. 2). Internally, the box 76 houses a power supply 120 as well as conventional control circuitry 122 for the device 20 as well as any other audio or communications equipment 124 forming a part of the apparatus 10 (e.g., a radio receiver, a two-way communications radio, or a cellular telephone), as shown in FIG. 10. Additionally, the bottom wall of box 76 is equipped with four component attachment openings 91a–91d (see FIG. 4) for selective attachment of an audio jack, video jack, power jack and computer monitor input jack.

As explained previously, the device 20 may be any device which will enhance viewing by the user, such as binoculars, a video camera or a standard photographic camera. Such devices may be secured using the tray-mounted Velcro strips 54, i.e., mating Velcro strips are affixed to the underside of the device 20 for contact with the strips 54. Alternately, a threaded fastener may be inserted through the opening 15 provided through sidewall 48.

It will be understood that the device 20, headphones 30, 32, light 88, and any other equipment 124 provided with the apparatus 10 are coupled via conventional electrical connectors to the power supply 120 and control circuitry 122 housed within box 76. Such wiring, connections and control circuitry are well within the skill of the art.

In use of apparatus 10, the user first puts on the apparatus by appropriately sizing the headband 16 and placing it as shown in FIG. 1. Next, the headphones 30, 32 are swung downwardly to a position adjacent the user's ears. The device 20, supported on the tray 18, is then positioned for most comfortable viewing and use by movement of arms 12, 14 about the fasteners 22. Vertical adjustment of the tray 18 and device 20 is effected by manual movement of the bracket 56 upwardly or downwardly, this being permitted by the slots 64, 66 and the fasteners 72. Fore and aft adjustment of the device 20 is accomplished simply by grasping the depending microphone 52 and moving it (and thus tray 18 and device 20) as required. As illustrated in FIG. 4, the recess 58b allows a full fore and aft range of movement of the tray 18.

When the apparatus 10 is positioned as shown in FIGS. 1 and 2, the switch 82 is operated and the knobs 80 manipulated so as to adjust the operation of the device 20 to fit the needs of the user. If the apparatus 10 includes a cellular telephone or two-way radio, the microphone 52 is appropriately positioned to pick up the speech of the user. As necessary, the antenna 84 can be elevated and adjusted for improved reception, and the light 88 can be activated as the user desires.

Returning to FIGS. 4 and 5, the tray 18 preferably includes a pair of holes 93, 95 therein slightly inboard from the arm 12. The holes are approximately ¾ inch in diameter and one of the holes is provided to allow a focus adjusting knob on the bottom of a zoom binocular or monocular to extend through the bottom of the tray so that a user may conveniently focus the binocular or monocular underneath the tray rather than having to reach on top of the binocular or monocular to perform such focusing. Similarly, the other hole allows a zoom control knob on a binocular or monocular to extend therethrough for easy adjustment from underneath the tray.

When the use of device 20 is no longer desired, the user pushes the tray 18 forwardly away from the eyes by moving the fasteners 74 in slots 68, 70 and the fasteners 75 in the slots 58a, 58c. Next the user simply pivots the arms 12, 14 upwardly about the axes of the fasteners 22 until the forward portion of the apparatus 10 is in an elevated and retracted position outside the field of vision of the user. This non-use position is shown in FIG. 3. In this orientation, the radio receiver could still be used in which event the headphones 30, 32 would remain lowered; alternately, these could be swung upwardly in general alignment with the corresponding arms 12, 14.

FIGS. 6–9 depict the apparatus 10 in conjunction with a cap assembly 92. The later includes a rearmost segment 94, a forward bill portion 96, and an intermediate flexible section 98. The cap assembly 92 is preferably secured to the apparatus 10 through the use of strategically located mating Velcro strips. Thus, and referring to FIGS. 1–5, it will be observed that Velcro strips 100 are mounted on band 24 at locations adjacent the fasteners 22 and at the rearmost central region thereof, while additional Velcro strips 102 and 104 are secured to the outer surface of arm 14 and the top 86 of box 76, respectively. Corresponding Velcro strips (not shown) are secured to the inner surfaces of the rear segment 94 and bill portion 96 so as to permit ready attachment and detachment of the cap assembly 92 from the apparatus 10.

In more detail, the rear segment 94 is adapted to conform to the rear upper section of the user's head and is secured in place by a Velcro attachment with the band 24. This segment may be formed of cloth or other material. The bill portion 96 includes an upper, arcuate, concave section 106 which overlies the upper and forehead portion of the user's head, as well as a forwardly extending bill 108. The bill 108 has a depending flap 110 oriented for close contact with the outer surface of arm 14 and the Velcro strips 102, as well as a laterally projecting flap 112 which overlies box 76 and the Velcro strips 104. As explained previously, the inner surface of flap 110 and the underside of flap 112 are equipped with Velcro strips mating with the strips 102 and 104.

Figure 8:
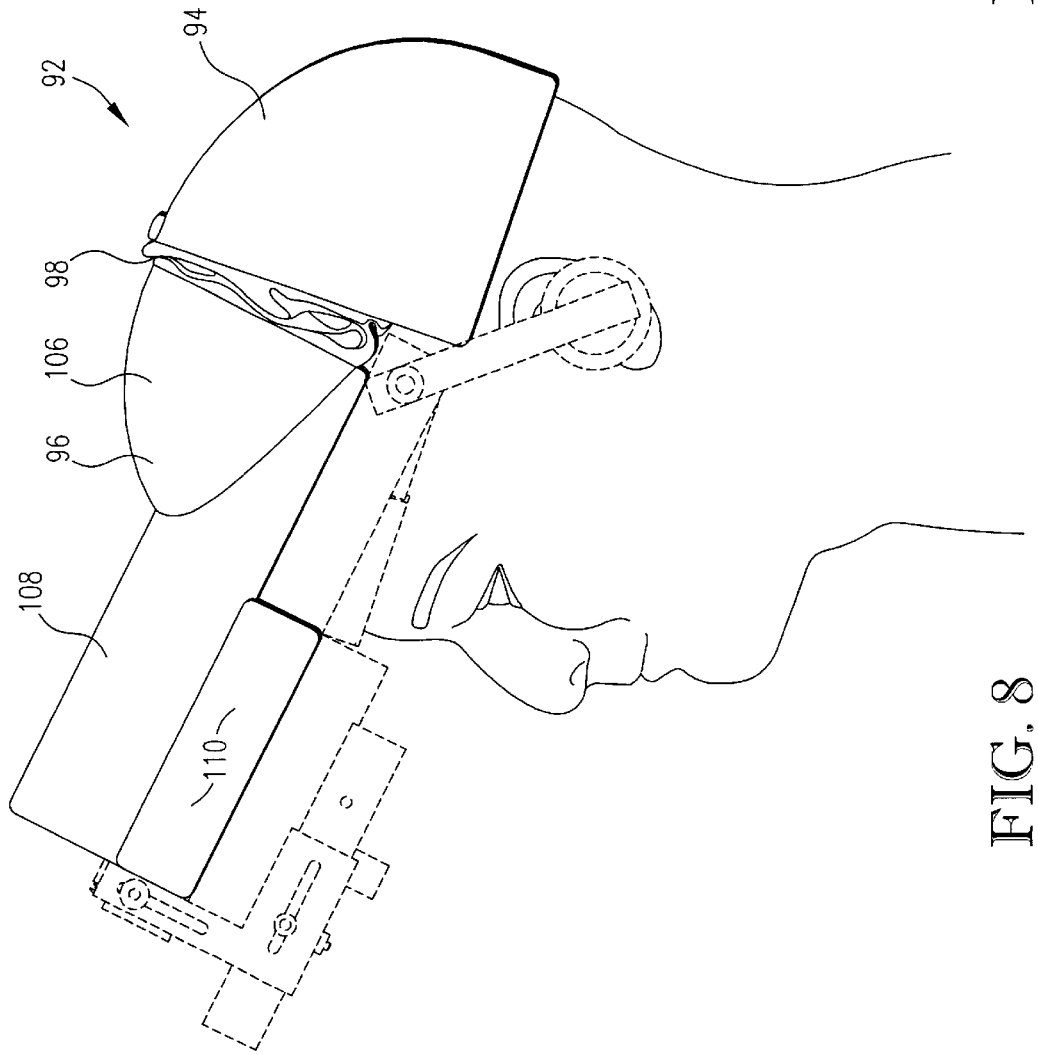
FIG. 8 is side view of the apparatus and cap assembly opposite that illustrated in FIG. 6 and showing the apparatus and cap assembly in the elevated, retracted position thereof.

The flexible section 98 interconnects the segment 94 and bill portion 96 and permits movement of the apparatus 10 between the lower use and upper retracted positions thereof, without the necessity of removing the cap assembly 92. This is shown in FIG. 8, where the flexible section 98 folds upon itself to accommodate upward movement of the apparatus 10.

It will be appreciated that the cap assembly 92 provides the user with protection from the elements and moreover provides a measure of protection to the device 20 and box 76. Also, the assembly 92 presents a more pleasing and attractive overall appearance when apparatus 10 is used.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An apparatus for holding one of a plurality of viewing devices at the eye level of a user comprising:
   a pair of elongated arms each having a first and a second end;
   an attachment for mounting said first ends of said arms on opposite sides of the user's head with the arms extending forwardly and said second arm ends spaced from the user's head;
   an adjustment bracket extending between and secured adjacent the second ends of said arms; and
   a tray supported upon said bracket forwardly of the user's head, said tray having a nose-receiving recess in a rearward surface and adapted to hold said viewing device from below,
   said arms being swingable between a use position where said viewing device is at the user's eye level and a crosspiece of said tray is below the user's eye level, and an elevated retracted position where the viewing device is moved out of the user's field of vision.

2. The apparatus as set forth in claim 1, said attachment comprising an adjustable headband adapted to extend about the user's head.

3. The apparatus as set forth in claim 1, said first end of each said arms being swingably secured to said attachment.

4. The apparatus as set forth in claim 1, said tray being shiftably supported by said arms for selective movement of the tray toward and away from the user's head.

5. The apparatus as set forth in claim 1, said apparatus including a component box secured to one of said arms, said component box including a power supply and circuitry for controlling operations of said device.

6. The apparatus as set forth in claim 5, said component box including external controls operably coupled with said circuitry.

7. The apparatus as set forth in claim 5, said box having a light source on the forward end thereof remote from said user's head.

8. The apparatus as set forth in claim 5, said component box including communications equipment selected from the group consisting of: a radio receiver, a two-way communications radio, and a cellular telephone.

9. The apparatus as set forth in claim 1, said apparatus including first and second headphones secured respectively to said arms and positionable adjacent the ears of said user.

10. The apparatus as set forth in claim 1, said apparatus including a microphone secured to said tray.

11. The apparatus as set forth in claim 1, said apparatus including a cap assembly secured to said attachment for covering the user's head, said cap assembly including a bill portion extending forwardly in at least partial covering relationship to said device.

12. The apparatus as set forth in claim 11, said bill portion including an attachment segment for coupling to one of said arms.

13. The apparatus as set forth in claim 11, said bill portion being moveable with said arms during said swinging movement thereof.

14. The apparatus as set forth in claim 13, said cap assembly including a flexible segment accommodating said movement of said bill portion.

15. The apparatus as set forth in claim 11, said attachment and cap assembly including Velcro mating strip for securement of the cap assembly to the attachment.

16. The apparatus as set forth in claim 1, said tray carrying at least one Velcro strip for removable attachment of said device thereto.

17. An apparatus for holding a binocular at the eye level of a user comprising:
   a pair of elongated arms each having a first and a second end;
   an attachment for mounting said first ends of said arms on opposite sides of the user's head with the arms extending forwardly and said second arm ends spaced from the user's head;
   an adjustment bracket extending between and secured adjacent the second ends of said arms; and
   a tray supported upon said bracket forwardly of the user's head, said tray having a nose-receiving recess in a rearward surface and adapted to hold said binocular from below,
   said arms being swingable between a use position where said binocular is at the user's eye level and a crosspiece of said tray is below the user's eye level, and an elevated retracted position where the binocular is moved out of the user's field of vision.

18. An apparatus for holding a camera at the eye level of a user comprising:

a pair of elongated arms each having a first and a second end;

an attachment for mounting said first ends of said arms on opposite sides of the user's head with the arms extending forwardly and said second arm ends spaced from the user's head; and an adjustment bracket extending between and secured adjacent the second ends of said arms; and a tray supported upon said bracket forwardly of the user's head, said tray having a nose-receiving recess in a rearward surface and adapted to hold said camera from below, said arms being swingable between a use position where said camera is at the user's eye level and a crosspiece of said tray is below the user's eye level, and an elevated retracted position where the camera is moved out of the user's field of vision.

* * * * *